(12) United States Patent
Adam et al.

(10) Patent No.: US 10,511,554 B2
(45) Date of Patent: Dec. 17, 2019

(54) MAINTAINING TRIBAL KNOWLEDGE FOR ACCELERATED COMPLIANCE CONTROL DEPLOYMENT

(71) Applicant: International Business Machines Corporation, Armonk, NY (US)

(72) Inventors: Constantin Mircea Adam, Norwalk, CT (US); Muhammed Fatih Bulut, New York, NY (US); Richard Baxter Hull, Chatham, NJ (US); Anup Kalia, Elmsford, NY (US); Maja Vukovic, New York, NY (US); Jin Xiao, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 99 days.

(21) Appl. No.: 15/832,330

(22) Filed: Dec. 5, 2017

(65) Prior Publication Data

US 2019/0173813 A1    Jun. 6, 2019

(51) Int. Cl.
| G06F 17/27 | (2006.01) |
| H04L 12/58 | (2006.01) |
| G06N 5/02 | (2006.01) |
| G06Q 10/10 | (2012.01) |
| G06F 16/332 | (2019.01) |

(52) U.S. Cl.
CPC ........ *H04L 51/046* (2013.01); *G06F 16/3329* (2019.01); *G06F 17/2785* (2013.01); *G06N 5/02* (2013.01); *G06Q 10/10* (2013.01); *H04L 51/36* (2013.01)

(58) Field of Classification Search
CPC ...................................................... G06F 17/02
USPC .......................................... 704/1, 9, 10, 257
See application file for complete search history.

(56) References Cited

U.S. PATENT DOCUMENTS

| 8,589,414 | B2 | 11/2013 | Waite et al. |
| 8,667,103 | B2 | 3/2014 | Adar et al. |
| 9,348,815 | B1 * | 5/2016 | Estes .................... G06F 17/2785 |
| 9,503,412 | B1 | 11/2016 | Reiner et al. |
| 9,652,730 | B2 | 5/2017 | Ramamurthy |

(Continued)

FOREIGN PATENT DOCUMENTS

| WO | 2016186774 A1 | 11/2016 |
| WO | 2016186834 A1 | 11/2016 |

*Primary Examiner* — Jesse S Pullias
(74) *Attorney, Agent, or Firm* — Amin, Turocy & Watson, LLP

(57) ABSTRACT

Techniques facilitating maintenance of tribal knowledge for accelerated compliance control deployment are provided. In one example, a system includes a memory that stores computer executable components and a processor that executes computer executable components stored in the memory, wherein the computer executable components include a knowledge base generation component that generates a knowledge graph corresponding to respective commitments created via tribal exchanges, the knowledge graph comprising a semantic level and an operational level; a semantic graph population component that populates the semantic level of the knowledge graph based on identified parties to the respective commitments; and an operational graph population component that populates the operational level of the knowledge graph based on tracked status changes associated with the respective commitments.

19 Claims, 13 Drawing Sheets

(56) References Cited

U.S. PATENT DOCUMENTS

| | | | |
|---|---|---|---|
| 10,262,654 B2* | 4/2019 | Hakkani-Tur | G10L 15/16 |
| 2002/0049692 A1 | 4/2002 | Venkatram | |
| 2002/0062353 A1 | 5/2002 | Konno et al. | |
| 2006/0200571 A1 | 9/2006 | Backman | |
| 2007/0294229 A1 | 12/2007 | Au | |
| 2009/0112678 A1 | 4/2009 | Luzardo | |
| 2011/0173052 A1 | 7/2011 | Deshpande | |
| 2012/0030729 A1* | 2/2012 | Schwartz | G06Q 10/0633 726/1 |
| 2012/0296832 A1 | 11/2012 | Beringer et al. | |
| 2014/0214404 A1 | 7/2014 | Kalia et al. | |
| 2014/0215472 A1 | 7/2014 | Motahari Nezhad et al. | |
| 2017/0017635 A1* | 1/2017 | Leliwa | G06F 17/271 |
| 2017/0358623 A1 | 12/2017 | Thothadri et al. | |
| 2018/0061401 A1* | 3/2018 | Sarikaya | G10L 15/183 |
| 2018/0082197 A1* | 3/2018 | Aravamudan | G06F 17/2785 |
| 2018/0129941 A1* | 5/2018 | Gustafson | G06N 5/02 |

* cited by examiner

MAINTAINING TRIBAL KNOWLEDGE FOR ACCELERATED COMPLIANCE CONTROL DEPLOYMENT

BACKGROUND

The subject disclosure relates to management of computing devices, and more specifically, to deploying compliance controls to devices of a computing environment.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate maintenance of tribal knowledge for accelerated compliance control deployment are described.

According to an embodiment, a system can include a memory that stores computer executable components and a processor that executes computer executable components stored in the memory, where the computer executable components include a knowledge base generation component that generates a knowledge graph corresponding to respective commitments created via tribal exchanges, the knowledge graph including a semantic level and an operational level, a semantic graph population component that populates the semantic level of the knowledge graph based on identified parties to the respective commitments, and an operational graph population component that populates the operational level of the knowledge graph based on tracked status changes associated with the respective commitments.

According to another embodiment, a computer-implemented method can include generating, by a device operatively coupled to a processor, a knowledge graph corresponding to respective commitments created via tribal exchanges, the knowledge graph including a semantic level and an operational level, populating, by the device, the semantic level of the knowledge graph based on identified parties to the respective commitments, and populating, by the device, the operational level of the knowledge graph based on tracked status changes associated with the respective commitments.

According to a further embodiment, a computer program product for extracting and maintaining tribal knowledge can include a computer readable storage medium having program instructions embodied therewith. The program instructions can be executable by a processing component to cause the processing component to generate a knowledge graph corresponding to respective commitments created via tribal exchanges, the knowledge graph including a semantic level and an operational level, populate the semantic level of the knowledge graph based on identified parties to the respective commitments, and populate the operational level of the knowledge graph based on tracked status changes associated with the respective commitments.

DETAILED DESCRIPTION

Figure 1:
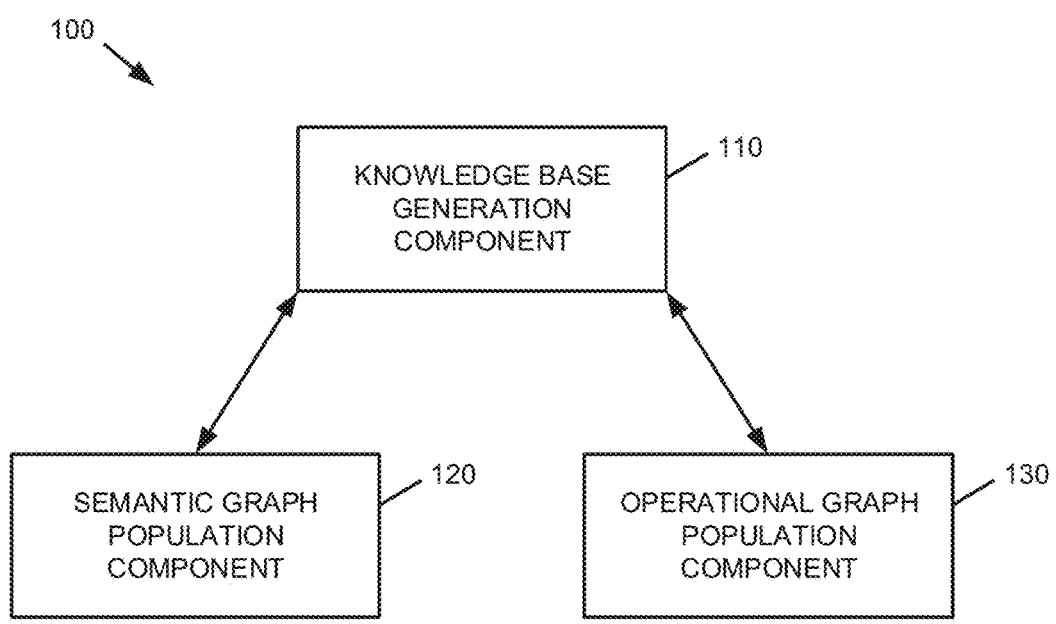
FIG. 1 is a block diagram of a system that facilitates maintaining tribal knowledge for accelerated compliance control deployment according to one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

Advances in computing and communication technology have led to an increase in the number of ways places such as homes and businesses use computing networks. For instance, computing networks can enable varied tasks that previously utilized separate systems and/or manual (paper) records, such as automation, communication, and data storage to be performed via a single unified infrastructure.

Due to the larger role computing networks now play in modern life, it is desirable to implement procedures to ensure the continued and efficient operation of such networks. To this end, a computing network can be associated with a set of procedures for maintaining and securing the network, and compliance with these procedures can be monitored. For instance, procedures can be put in place for password updates, services used by the computing network, audits performed for the computing network, or the like, to maintain the integrity and security of the network. Further, compliance controls can be put into place to identify and correct issues with various ones of the above procedures, such as invalid/out-of-date passwords, insecure data and/or devices, etc.

To improve the performance of computing networks, it is desirable to implement automated procedures for creating and enforcing compliance controls as noted above. However, automation of compliance controls can in some cases be based upon information stored in the computing network at multiple sources having different formats that cannot be readily accessed or compiled by a human user in a useful or reasonable timeframe. In addition, procedures and/or their associated compliance controls can in some cases be associated with respective subject matter experts (SMEs) responsible for those controls, which can in some cases not be readily identified and/or identified only via subjective human judgment.

To the furtherance of the above and/or related ends, systems and methods are described herein that can assist human users in the deployment of automated compliance controls by parsing a complex network of tribal exchanges from conversations, forum postings, chats, emails, wikis, software repository (e.g., Github) issues, etc., and building a tribal knowledge graph or knowledge base, focusing on knowledge that does not exist or is not kept up-to-date in a traditionally structured, well-defined, coherent set of documents. In particular, various embodiments described herein can perform one or more of the following: build a knowledge base scaffold from a standard list of control points and the knowledge accumulated from mapping regulations to those control points; detect and validate tribal exchanges; discover semantics and processes from tribal exchanges; assess the outcome of each process to recommend solutions and/or experts; build a valid list of solutions for respective compliance controls, including topics of interest, communal knowledge, best practices, and/or experts (e.g., SMEs, focals, leads, etc.); create a mapping between experts and solutions, and qualify expertise in terms of skill sets, commitments and/or outcomes; and/or establish correlations among different compliance controls and their solutions. These and/or other functions of respective embodiments provided herein are described in further detail with respect to the drawings that follow.

With reference now to the drawings, FIG. 1 is a block diagram of a system 100 that facilitates maintaining tribal knowledge for accelerated compliance control deployment according to one or more embodiments described herein. As shown in FIG. 1, the system 100 includes a knowledge base generation component that can generate a knowledge graph corresponding to respective commitments created via tribal exchanges. The knowledge graph can include a semantic level and an operational level, which can be populated by a semantic graph population component 120 and an operational graph population component 130, respectively. The semantic graph population component 120 can populate the semantic level of the knowledge graph based on identified parties to the respective commitments, while the operational graph population component 130 can populate the operational level of the knowledge graph based on tracked status changes associated with the respective commitments. The knowledge graph and its various levels as constructed by the semantic graph population component 120 and the operational graph population component 130 are described in further detail with respect to FIGS. 3-6 below.

In an aspect, the system 100 can build a knowledge graph that focuses on tribal knowledge, which can be knowledge that does not exist in a traditionally structured, well-defined, and/or coherent set of documents. In order to build the knowledge graph, the operational graph population component 130 can track various conversations and identify a point at which a commitment is established. The operational graph population component 130 can then focus on interactions after establishment of the commitment to determine whether the commitment further strengthened or weakened with the interaction.

Additionally, the semantic graph population component 120 can build a valid list of topics of interest and identify experts related to one or more topics in the list. The semantic graph population component 120 can further establish correlations between different topics in the last and/or between different people and different topics. Based on the data generated by the semantic graph population component 120 and the operational graph population component 130, the knowledge base generation component 110 can continuously and/or semi-continuously learn and improve contextual references as well as generate knowledge that can be consumable by artificial intelligence (AI) agents.

In an aspect, the system 100 can explore large amounts of otherwise untapped tribal exchanges such as conversations, forum postings, chats, emails, wikis, software repository issues, or the like. These exchanges can include know-how, solutions to problems, configuration and/or recommendations, etc., which can accelerate and facilitate deployment of automated compliance controls. Also or alternatively, the system 100 can gather and use knowledge accumulated during previous deployments, e.g., at the same site and/or different sites, to facilitate new accounts and/or deployments. By utilizing the system 100 as described herein, compliance controls can be documented and/or implemented in an automated manner in order to facilitate the deployment and maintenance of automated compliance controls at multiple distinct sites that can change over time, e.g., via staffing changes, hardware/software changes, or the like.

Figure 2:
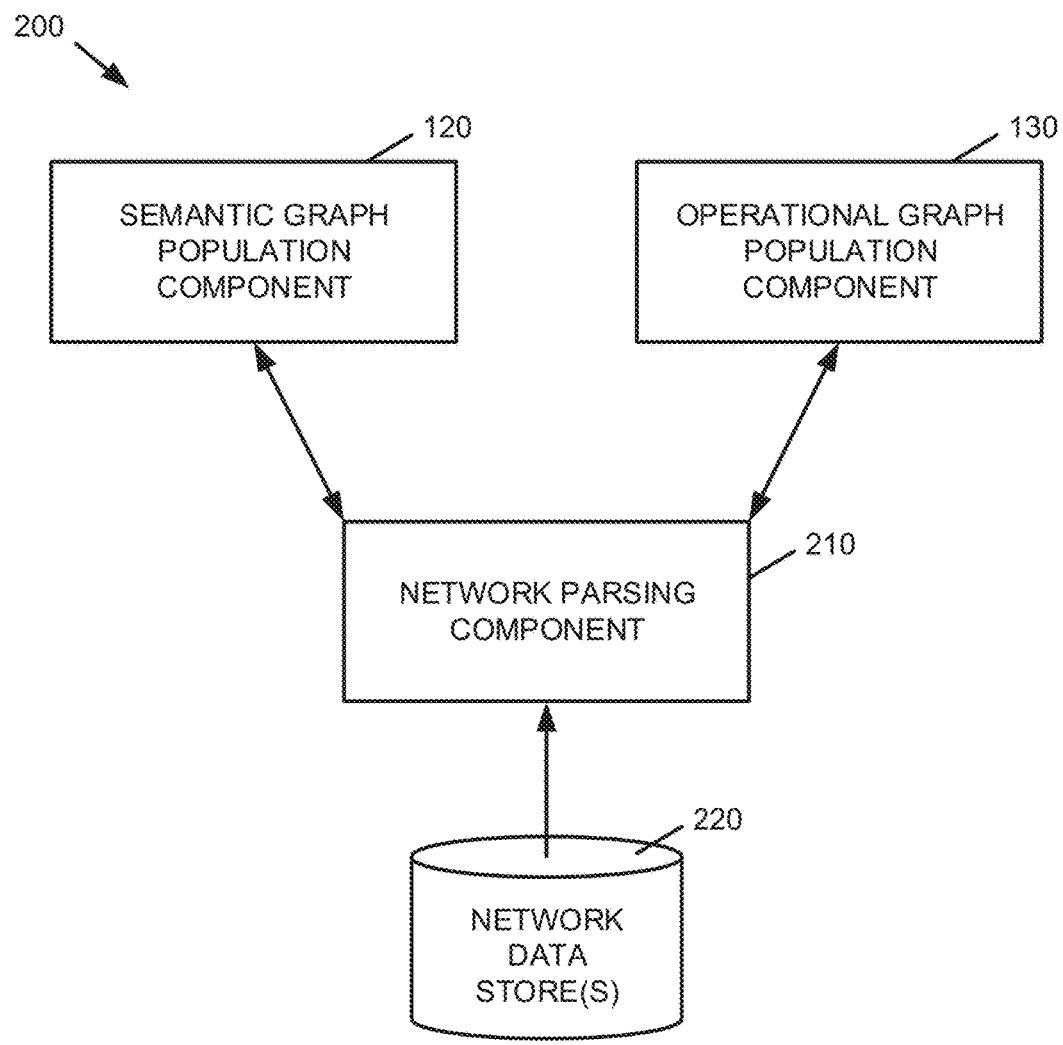
FIG. 2 is a block diagram of a system that facilitates extracting tribal knowledge from a computing network according to one or more embodiments described herein.

Turning next to FIG. 2, a block diagram of a system 200 that facilitates extracting tribal knowledge from a computing network according to one or more embodiments described herein is illustrated. Repetitive description of like elements employed in other embodiments described herein is omitted for sake of brevity. As shown in FIG. 2, the system 200 includes a semantic graph population component 120 and an operational graph population component 130 that can function (e.g., in combination with a knowledge base generation component 110 as shown in FIG. 1) to construct and populate a knowledge graph or knowledge base as generally described above with respect to FIG. 1. In addition, the system 200 includes a network parsing component 210 that can track respective conversations corresponding to tribal exchanges, resulting in tracked conversations. The network parsing component 210 can also identify respective establishment points in the tracked conversations for the respective commitments.

In an aspect, the network parsing component 210 can obtain information corresponding to respective conversations via one or more network data stores 220. Examples of network data stores 220 that can be utilized by the network parsing component 210 can include, but are not limited to, chat, message, email and/or other communication logs; issues, notes or similar information stored via a software repository; wiki pages, logs, edit histories, or the like; and/or any other suitable source of information that can in any aspect be pertinent to compliance controls. The network data stores 220 can maintain the above and/or other data in any suitable format, such as a database, a tree structure, a list or linked list, or the like.

In another aspect, the network parsing component 210 can extract tracked status changes associated with respective commitments based on analysis of portions of tracked conversations subsequent to the respective establishment points for the respective commitments. Example evolvements of a commitment that can be identified via tribal exchanges are described below with respect to FIG. 3.

Returning to FIG. 1, the knowledge base generation component 110 can construct a scaffold knowledge graph, which can be subsequently populated at least in part by extracting semantics and processes from conversations. By way of example, the knowledge base generation component 110, alone or in combination with the semantic graph population component 120 and/or the operational graph population component 130, can extract commitments from a tribal exchange. Here, a commitment represents a promise from a debtor toward a creditor. As used herein, a commitment can be represented as an expression Cx=C (Debtor, Creditor, Antecedent, Consequent), where x is an index of the commitment (e.g., C1, C2, etc.). Here, Debtor and Creditor are roles, and Antecedent and Consequent are message propositions.

Figure 3:
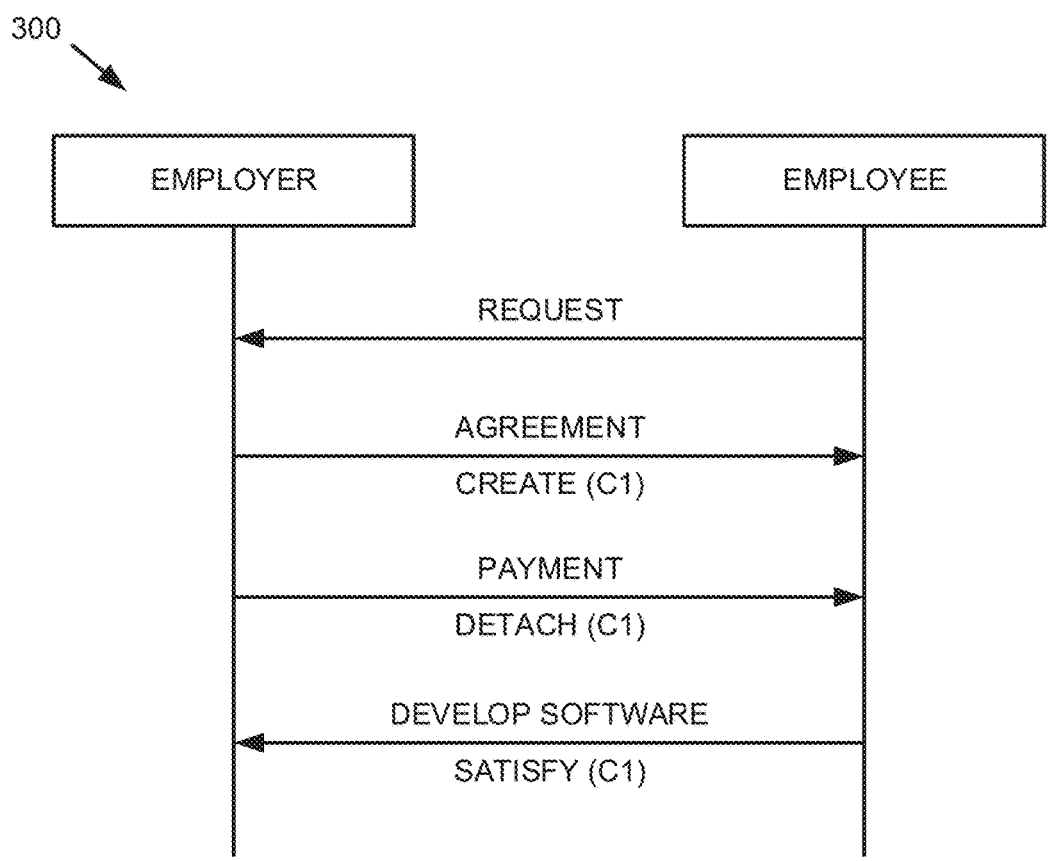
FIG. 3 depicts an example, non-limiting commitment that can be tracked by one or more embodiments described herein.

In an aspect, the semantic graph population component 120 and the operational graph population component 130 can construct semantic and operational knowledge graphs based on business meanings and processes, respectively. Diagram 300 in FIG. 3 depicts an example, non-limiting commitment that can be utilized by system 100 for inclusion in a generated knowledge graph. In the example shown by diagram 300, a manager submits a request to his employer to develop a software package, to which the employer agrees. By agreeing to the request, the employer creates a commitment which can be expressed as C1=C (Employer, Manager, payment, develop software).

As further shown in diagram 300, the operational graph population component 130 can track and record evolvements to the created commitment. For instance, the operational graph population component 130 can record the message in which the commitment was established, here the agreement by the employer to the Manager's request, as an initial message M1 that creates the event C1, which can be expressed as M1=create (C1). The operational graph population component 130 can additionally track subsequent messages as shown in diagram 300 that alter the status of commitment C1. For instance, a message in which the employer agrees to or provides payment pursuant to the commitment can be recorded as M2=detach (C1), and a message in which the Manager delivers the agreed-upon software package can be recorded as M3=satisfy (C1). As noted above, M1, M2, and M3 in the above example are messages, and create, detach, and satisfy are operational details associated with the commitment.

Figure 4:
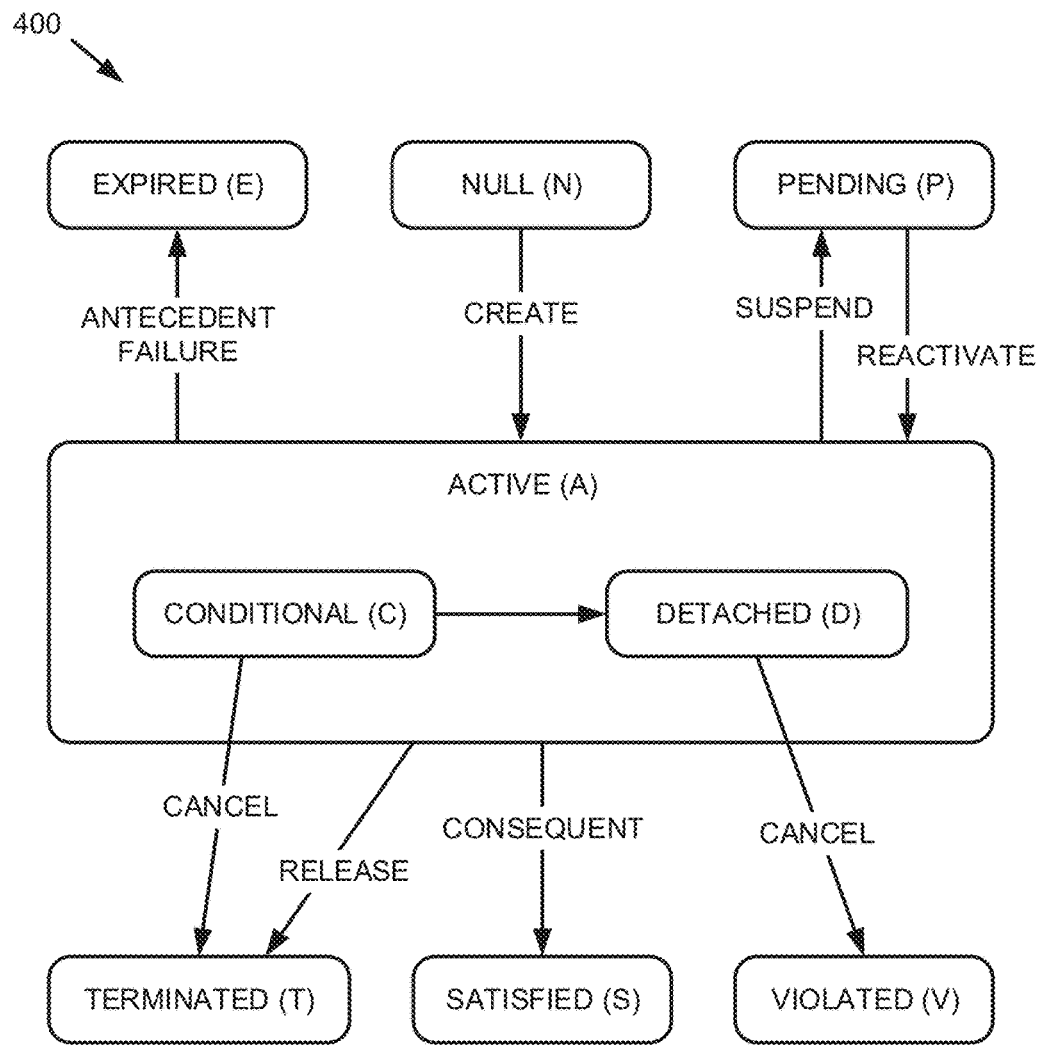
FIG. 4 depicts example, non-limiting commitment statuses that can be utilized by one or more embodiments described herein.
Figure 5:
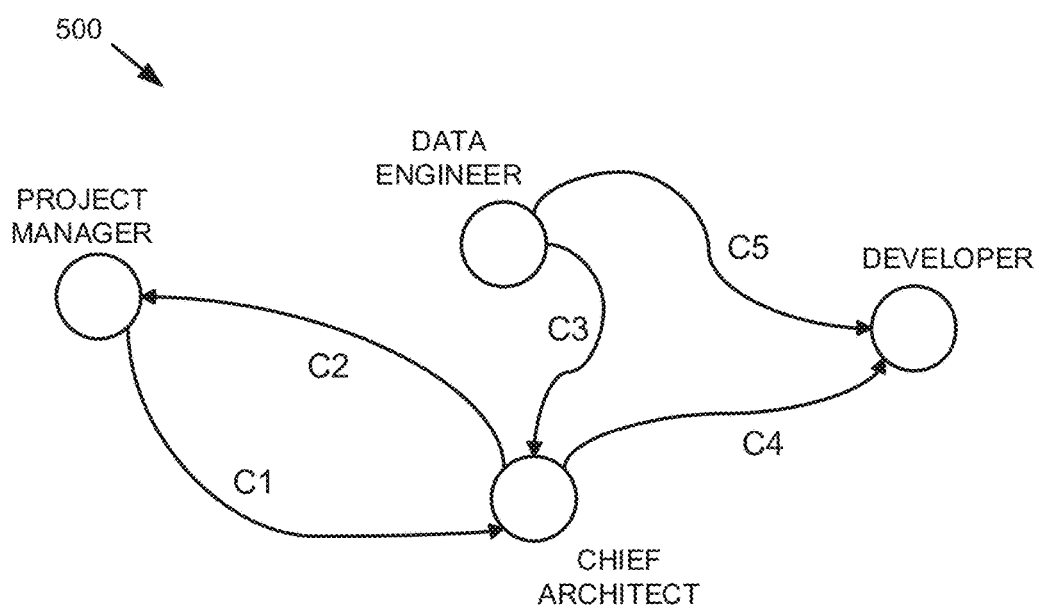
FIG. 5 depicts a semantic level of an example, non-limiting knowledge graph that can be constructed according to one or more embodiments described herein.

Diagram 400 in FIG. 4 illustrates a model of example, non-limiting commitment lifecycles and evolvements that can be tracked by various embodiments described herein. As shown by diagram 400, a commitment can be regarded as in a null state prior to its creation. Upon creation of a commitment, the commitment can enter an active state. An active commitment can be detached upon creation, or detachment of the commitment can be made conditional upon satisfaction of one or more conditions. In an aspect, a conditional commitment can be identified by system 100 based on conditional statements in tracked messages, e.g., "If X occurs, I agree to do Y." As shown in diagram 400, successful completion of the condition(s) can cause the conditional commitment to become a detached commitment, while failure of the condition(s) can cause the commitment to be terminated. As further shown by diagram 400, a commitment can also become terminated if the commitment is released while active.

Once an active commitment is detached, the commitment can evolve in multiple ways as further illustrated by diagram 400. For instance, a failure of the antecedent proposition of the commitment can cause the commitment to expire, while cancellation of the commitment subsequent to detachment can result in a violated commitment. Completion of the antecedent and consequent propositions of a commitment can result in satisfaction of the commitment. As further shown by diagram 400, an active commitment can be suspended, placing the commitment in a pending state. A pending commitment can then be reactivated and/or terminated.

In an aspect, the semantic graph population component 120 can populate the semantic level of a knowledge graph by identifying commitments created between roles in tribal exchanges. An example, non-limiting semantic graph level that can be populated by the semantic graph population component 120 is shown by diagram 500 in FIG. 5. Diagram 500 illustrates a set of commitments C1-C5 that are created between a project manager, a chief architect, a data engineer, and a developer associated with a given computing environment.

Figure 6:
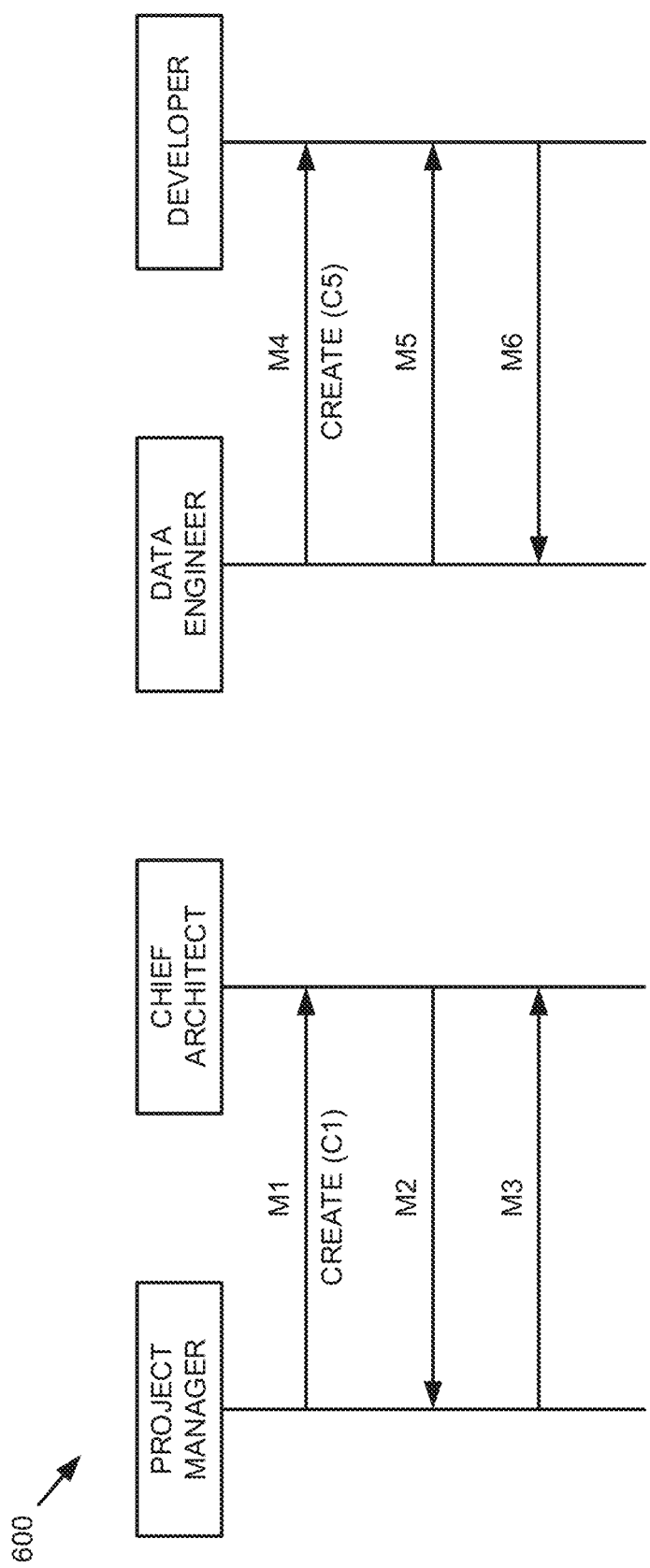
FIG. 6 depicts an operational level of an example, non-limiting knowledge graph that can be constructed according to one or more embodiments described herein.

In another aspect, the operational graph population component 130 can populate the operational level of a knowledge graph by tracking commitment evolvements (e.g., created, delegated, satisfied, terminated, violated, etc.) indicated in the tribal exchanges. Diagram 600 in FIG. 6 illustrates an example, non-limiting operational graph level that can be populated by the operational graph population component 130. The operational graph level shown by diagram 600 illustrates respective messages associated with commitment C1 between the project manager and the chief architect and commitment C5 between the data engineer and the developer as shown by diagram 500. While not shown in diagram 600, similar operational structures could be constructed for the other commitments shown in diagram 500 in a similar manner.

Figure 7:
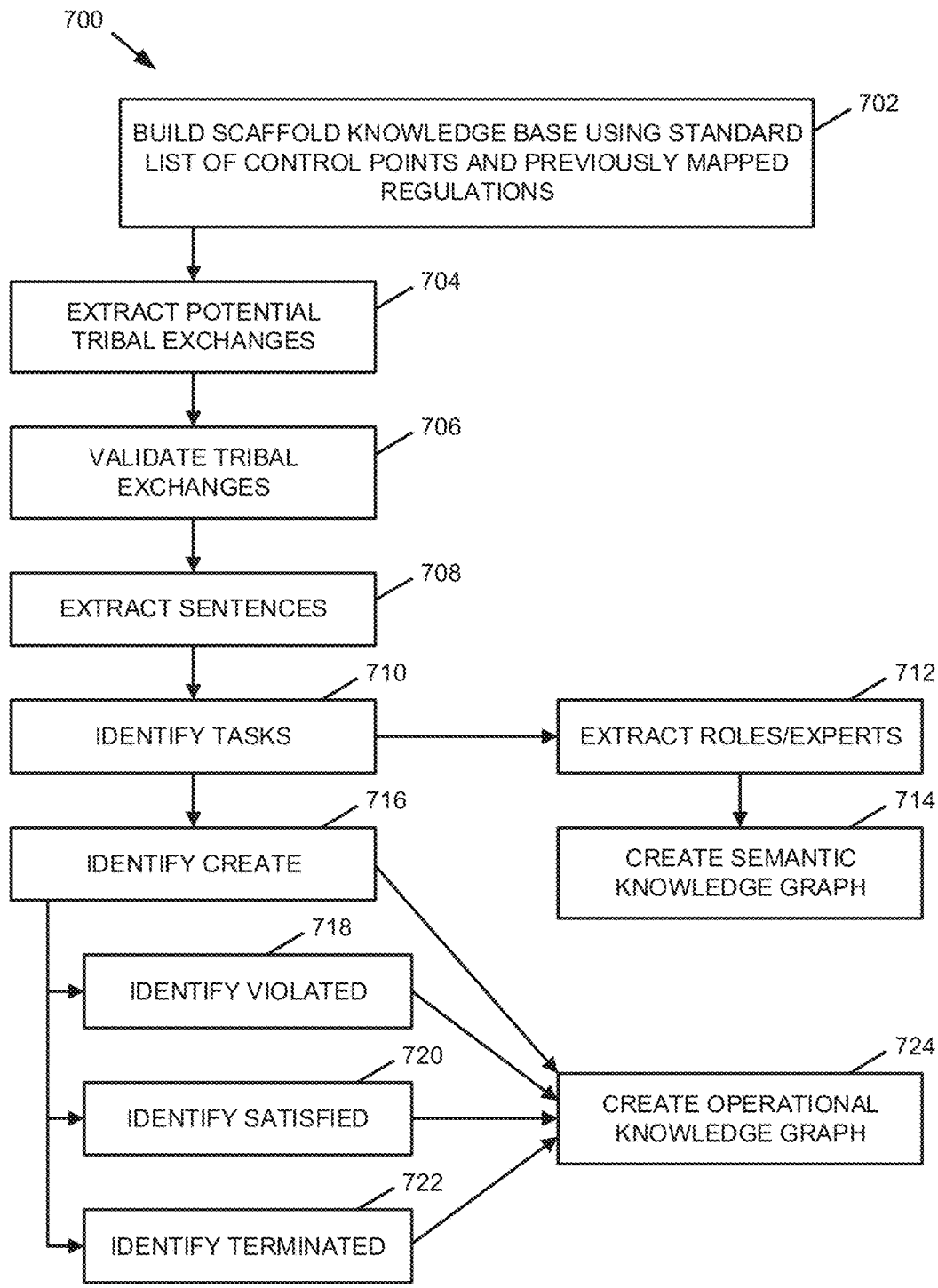
FIG. 7 is a flow diagram of an example, non-limiting computer-implemented method facilitating extracting and maintaining tribal knowledge according to one or more embodiments described herein.

FIG. 7 illustrates a flow diagram of an example, non-limiting computer-implemented method 700 that facilitates extracting and maintaining tribal knowledge in accordance with one or more embodiments described herein. Repetitive description of like elements employed in other embodiments described herein is omitted for sake of brevity. While not explicitly shown in FIG. 7, it should be appreciated that, where applicable, each act of method 700 can be performed by a computing device operatively coupled to a processor.

At 702, a scaffold knowledge base can be built (e.g., by a knowledge base generation component 110). The scaffold knowledge base can be constructed based on, e.g., a standard list of control points and/or previously mapped regulations. In an aspect, building the scaffold knowledge base at 702 can include pre-processing of associated network data (e.g., stored at network data store(s) 220), such as cleaning, munging, and/or otherwise formatting or manipulating the data for subsequent use.

At 704, potential tribal exchanges can be extracted (e.g., by a network parsing component 210) from data stored at the network data pre-processed in connection with building the scaffold knowledge base at 702. Extraction of potential tribal exchanges at 704 can include, e.g., compiling emails, message logs, wiki data, software repository issues, and/or other sources of information that are determined to have at least a threshold probability of containing relevant tribal exchanges.

In response to extracting potential tribal exchanges at 704, tribal exchanges can be validated (e.g., by the network parsing component 210 and/or the knowledge base generation component 110) at 706. In one example, validation of tribal exchanges at 706 can be performed at least in part by checking with an existing knowledge repository, e.g., to find common roles, relationships, actions, or the like between existing recorded tribal exchanges and the extracted exchanges.

At 708, sentences can be extracted (e.g., by the network parsing component 210) from the tribal exchanges extracted at 704 and validated at 706. In one example, sentences can be extracted at 708 at least in part by finding n-grams (e.g., unigrams, bigrams, trigrams, etc.) in the tribal exchanges and parsing the n-grams to identify sentences. One or more machine learning algorithms, such as those based on support vector machine (SVM) and/or deep learning, can be utilized to extract sentences at 708. Other techniques could also be used.

At 710, tasks can be identified (e.g., by the network parsing component 210) from the sentences extracted at 708. In an aspect, identification of tasks at 710 can be performed at least in part by identifying language in the extracted sentences that correspond to the creation or modification of a commitment associated with the respective tasks. By way of example, a task could be identified at 710 based on the presence of an action in combination with promissory language and/or other language conveying intent to perform the action in one or more sentences, e.g., "I will provide a report by next week." Other techniques for identifying tasks at 710 could also be used.

Following identification of tasks at 710, method 700 can proceed to 712 and/or 716. For simplicity of explanation, the acts shown with respect to method 700 are described below in numerical order; however, it should be appreciated that the actions at 712 and 716 can be performed in any order and/or in parallel (e.g., simultaneously or near simultaneously). Further, the actions at 712 and 716 can be performed by a same component and/or different components (e.g., by a semantic graph population component 120 and an operational graph population component 130, respectively).

At 712, semantic graph generation can begin by extracting (e.g., by a semantic graph population component 120) roles and/or experts associated with the tasks identified at 710. For instance, in the example given above of a task created via the statement "I will provide a report by next week," the recipient of the message can be designated as the creditor for the task and the originator of the statement can be designated as the debtor for the task. In another example, parties to a given task can be identified as an expert based on their performance relative to the given task and/or other tasks. Identification of experts is described in further detail with respect to FIG. 8 below.

At 714, a semantic knowledge graph, e.g., the semantic graph level of the knowledge base built at 702, is created (e.g., by the semantic graph population component 120) using the roles extracted at 712.

At 716, operational graph generation can begin by identifying (e.g., by an operational graph population component 130) creation events for respective tasks identified at 710. In an aspect, a creation event for a task can be associated with a statement that establishes a commitment corresponding to the task. In various examples, a commitment can be established by identifying a topic of interest in conjunction with a future tense verb (e.g., "I will provide a report by next week") and/or a present tense verb (e.g., "I am preparing a report per your request"). As tasks are established via commitment, identification of a creation event at 716 can be further based on explicit or implied presence of a debtor. For instance, the statement "I plan to file a report next week" in an email between team members can be considered an established commitment while the same statement made in a team member's development notes could be considered not to be a commitment.

Following identification of a created task at 716, evolvements to the task over time can be identified (e.g., via the operational graph population component 130) can be identified. Here, violated tasks can be identified at 718, satisfied tasks can be identified at 720, and terminated tasks can be identified at 722. In an aspect, evolvements to created tasks as identified at 718, 720, 722 can be tracked by focusing on interactions after establishment of a commitment, e.g., to determine whether the commitment strengthened or weakened with the interaction. Further details regarding the actions performed at 718, 720, 722 are provided in the following description. It should be appreciated that other task status changes than those shown in FIG. 7 could also be used in addition to, or in place of, the status changes identified at 718, 720, 722.

In an aspect, a violated commitment can be identified at 718 on the basis of negative sentiment expressed in communications relating to the commitment. For instance, a statement in which a task is referenced in the present or past tense that expresses negative sentiment towards the task (e.g., "I am unhappy with this," "you did a poor job on this," etc.), can be interpreted as a violation of the commitment. Similarly, a satisfied commitment can be identified at 720 on the basis of a statement in which a task is referenced in the present or past tense that expresses positive sentiment towards the task (e.g., "I am happy with this," "you did great work on this," etc.) can be interpreted as satisfaction of the commitment. In another aspect, a terminated commitment can be identified at 722 on the basis of language that indicates the cancellation or release of the commitment, which may be present (e.g., "we are discontinuing this project") or past tense (e.g., "this project has been canceled").

At 724, an operational knowledge graph, e.g., the operational graph level of the knowledge base built at 702, is created (e.g., by the operational graph population component 130) using the task status evolvements identified at 716, 718, 720, 722.

Figure 8:
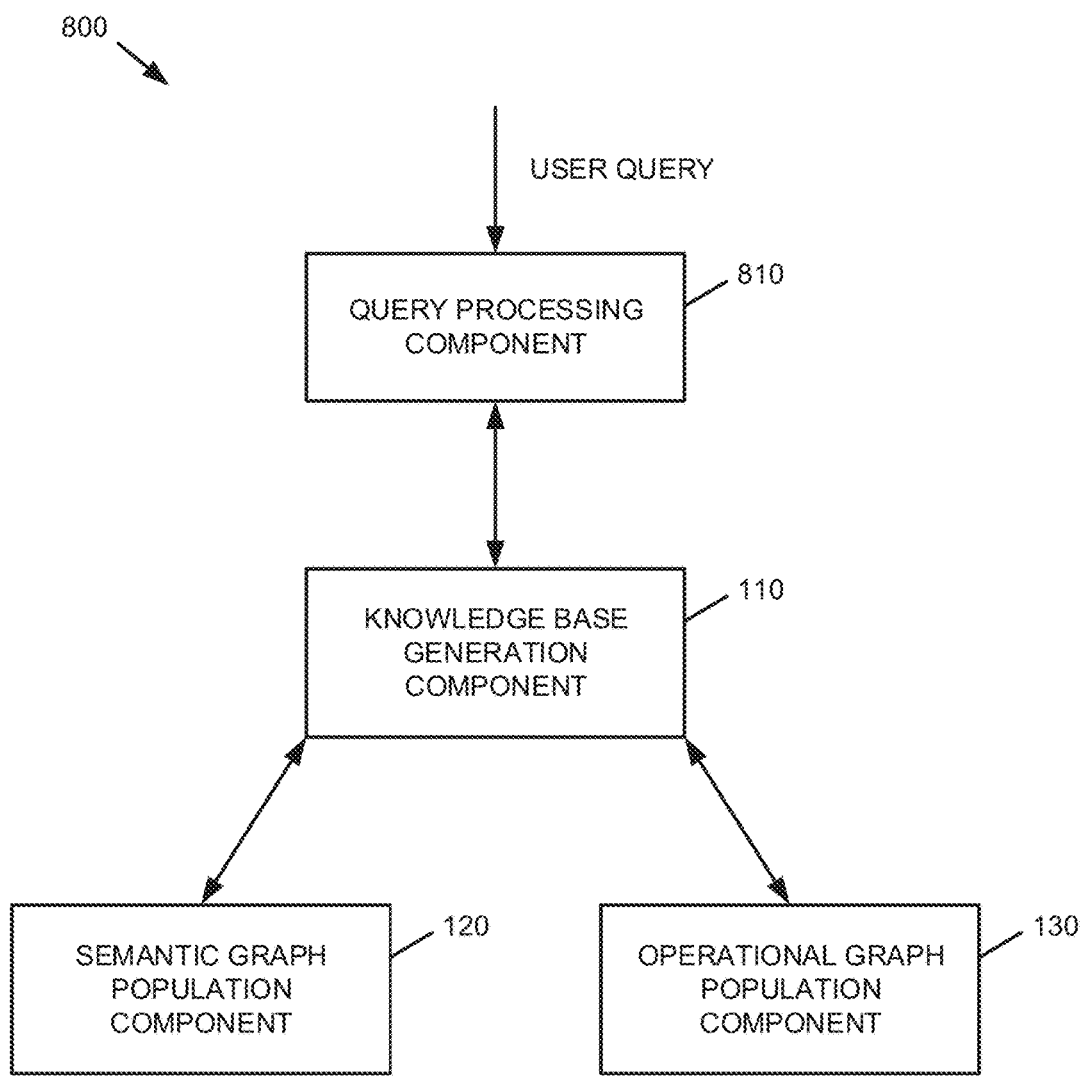
FIG. 8 is a block diagram of a system that facilitates querying a knowledge graph as constructed according to one or more embodiments described herein.

With reference next to FIG. 8, a block diagram of a system 800 that facilitates querying a knowledge graph as constructed according to one or more embodiments described herein is illustrated. Repetitive description of like elements employed in other embodiments described herein is omitted for sake of brevity. As shown in FIG. 8, the system 800 includes a query processing component 810 that receives a query for tribal knowledge associated with the knowledge graph generated by the knowledge base generation component 110. Based on a received query, the query processing component 810 identifies parties associated with the tribal knowledge based on the semantic level of the knowledge graph as populated by the semantic graph population component 120 and extracts operational information associated with the tribal knowledge based on the operational level of the knowledge graph as populated by the operational graph population component 130.

In an aspect, the knowledge base generation component 110 can generate information corresponding to the knowledge graph that can be examined and utilized by the query processing component 810. By way of example, the knowledge base generation component 110 can build a list of topics of interest based on the knowledge graph. To this end, the knowledge base generation component 110 can extract topics from exchanges associated with a computing environment, such as procedures, persons, objects, or the like, based on computations performed with respect to the knowledge graph. For instance, a set of communications for which a commitment is established to update firewall firmware for a given network could be associated with topics corresponding to firewalls, firmware, updates, networks, etc.

Also or alternatively, the knowledge base generation component 110 can identify experts (e.g., SMEs) related to respective ones of the identified topics of interest based on the knowledge graph built by the knowledge base generation component 110 and the underlying tribal exchanges from which the knowledge graph was built. In an aspect, the knowledge base generation component 110 can identify experts in respective topics and/or areas using a set of objective rules for identifying experts in an automated manner. For instance, a person can be designated as an expert for a given topic by the knowledge base generation component 110 who is involved with at least a threshold amount of tribal exchanges corresponding to the topic, either in absolute terms or in relative terms (e.g., a percentage of all exchanges pertaining to the topic). In another example, a person can be designated as an expert for a given topic by the knowledge base generation component 110 who, based on the tribal exchanges corresponding to the topic, has worked on at least a threshold amount of previously satisfied tasks corresponding to the topic. As in the previous example, this threshold can be an absolute amount or a relative amount. Relative thresholds can be based on, e.g., a percentage of all satisfied tasks relevant to a topic that were performed by a given person, a ratio of satisfied tasks relevant to the topic performed by a given person to violated or otherwise unsatisfied tasks performed by the given person, and/or other metrics.

In one or more of the examples above, a user can provide feedback to the knowledge base generation component 110 to refine and/or validate designations of topics of interest and/or experts in accordance with one or more of the above examples. However, it should be appreciated that in the above examples, topics, subject matter experts, and/or other information related to respective topics can be designated by the knowledge base generation component 110 in an automated manner without subjective human decisions.

In an aspect, the query processing component 810 can respond to a query of the knowledge graph by deriving keywords from the query and using the derived keywords to examine the semantic and operational levels of the knowledge graph for relevant information. By way of specific, non-limiting example, given the query "How can I build a formal process for approving and testing all network connections and changes to the firewall and router configurations?," the query processing component 810 can derive keywords such as "firewall," "router," "network," "connections," or the like using natural language processing (NLP) techniques. These keywords can then be used by the query processing component 810 to query the semantic knowledge graph to identify roles and/or experts who have already worked on or are currently working on the issue(s) referenced in the query. Based on the discovered roles/experts and their corresponding commitments, the query processing component 810 can extract information from the operational knowledge graph regarding matters such as which router/firewall connections are already in place, why those connections were set up, configuration processes for firewalls and/or routers that enable connection testing, and so on.

In an aspect, the query processing component 810 can expedite the processing of queries by establishing correlations associated with the knowledge graph built by the knowledge base generation component 110, such as correlations between different topics of interest, correlations between respective people and respective topics, etc. The query processing component 810 can use these correlations in addition to other information contained within the knowledge graph to improve efficiency associated with processing queries. In another aspect, the query processing component 810 can continuously or near-continuously learn and refine contextual references between topics and/or persons represented by the knowledge graph using one or more machine learning algorithms.

Figure 9:
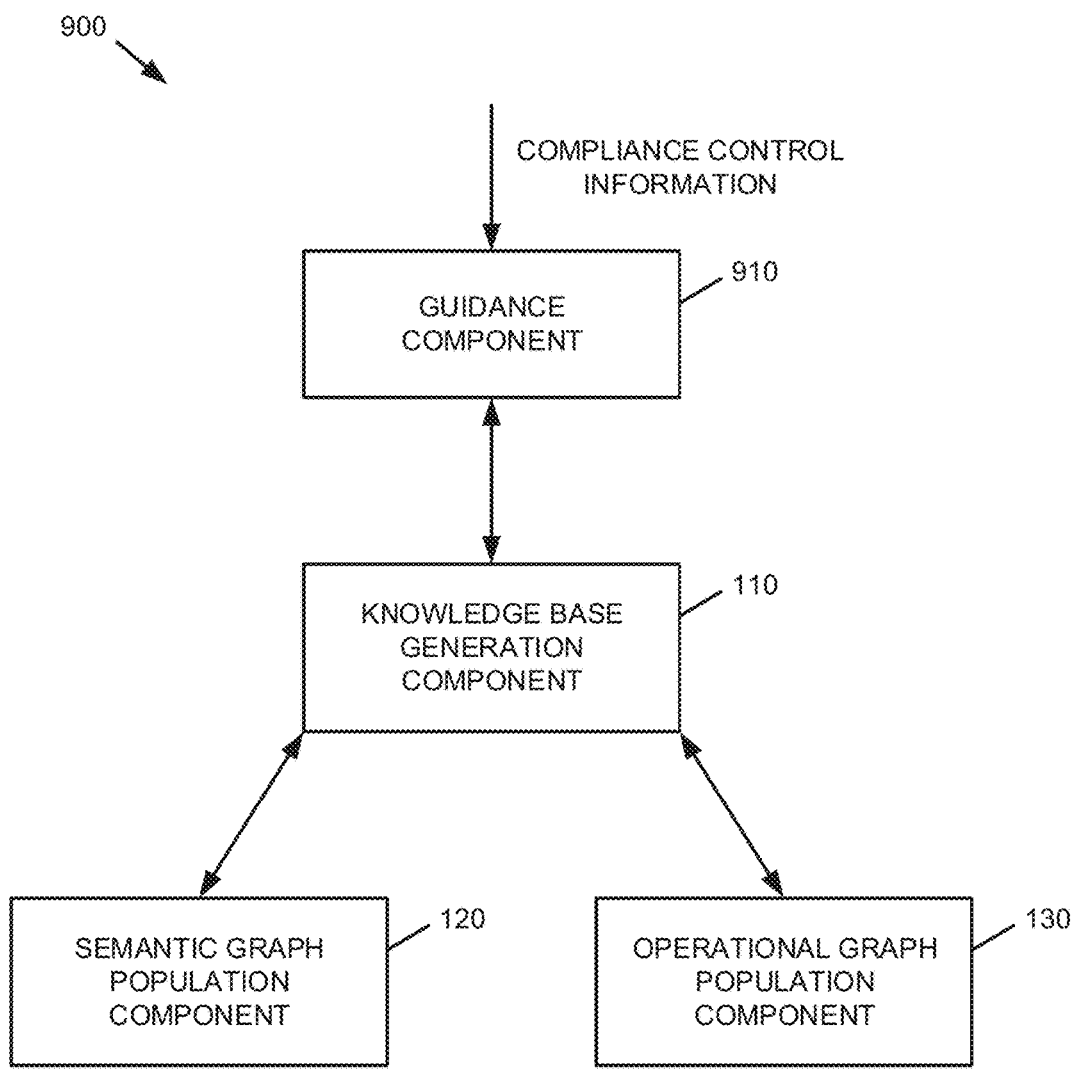
FIG. 9 is a block diagram of a system that facilitates guidance of a user through automated deployment of compliance controls according to one or more embodiments described herein.

Turning to FIG. 9, a block diagram of a system 900 that facilitates guidance of a user through automated deployment of compliance controls according to one or more embodiments described herein is illustrated. Repetitive description of like elements employed in other embodiments described herein is omitted for sake of brevity. As shown in FIG. 9, the system 900 includes a guidance component 910 that can provide information to a user regarding deployment of automated compliance controls based on the knowledge graph generated by the knowledge base generation component 110 at the semantic level (e.g., as populated by the semantic graph population component 120) and the operational level (e.g., as populated by the operational graph population component 130).

In an aspect, the guidance component 910 can include one or more artificial intelligence (AI) agents that can learn about the different types of tribal knowledge present in a system, the owners (e.g., roles, experts, etc.) of that knowledge and their behavior and refine this knowledge over time in response to additional and/or changing information. Based on this knowledge, the guidance component 910 can educate users, guide them through respective processes, and address their concerns during the deployment of automated compliance controls, e.g., in a new account.

In one example, guidance can be provided to a user by the guidance component 910 in response to a query processed by the query processing component 810. For instance, in the example of the query "How can I build a formal process for approving and testing all network connections and changes to the firewall and router configurations?" as given above, the guidance component 910 can provide information and/or other guidance to assist the user in developing and/or implementing the requested process as well as identifying experts relating to the process who can provide additional assistance.

Figure 10:
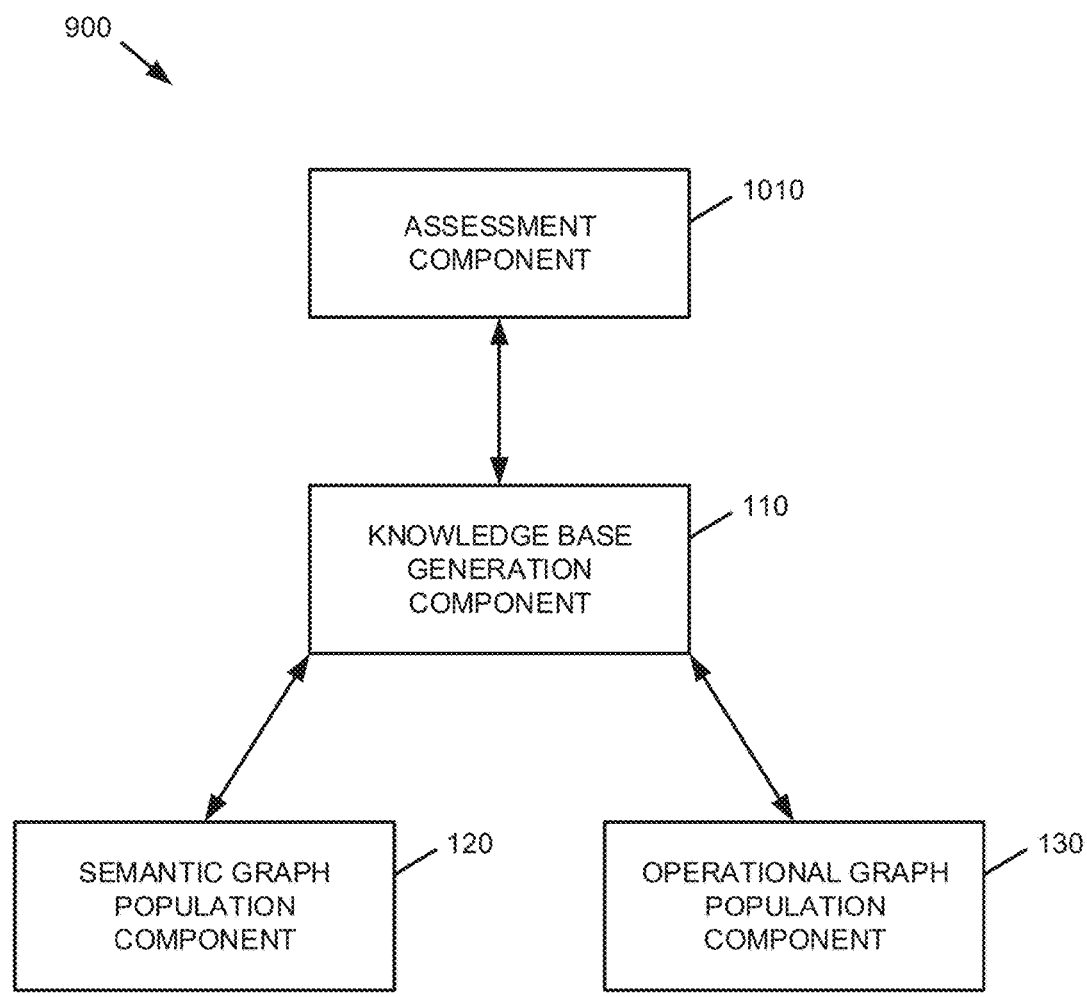
FIG. 10 is a block diagram of a system that facilitates compliance control assessment according to one or more embodiments described herein.

With reference next to FIG. 10, a block diagram of a system 1000 that facilitates compliance control assessment according to one or more embodiments described herein is illustrated. Repetitive description of like elements employed in other embodiments described herein is omitted for sake of brevity. As shown in FIG. 10, the system 1000 includes an assessment component 1010 that can retrieve an account configuration from the knowledge graph built by the knowledge base generation component 110 at the semantic level (e.g., as populated by the semantic graph population component 120) or the operational level (e.g., as populated by the operational graph population component 130). The assessment component 1010 can further assess an impact of enforcing a compliance control associated with the knowledge graph, e.g., based on the retrieved account configuration. In an aspect, the assessment component 1010 can retrieve details regarding account configurations to assess the implications of enforcing a specific compliance control.

This can include, but is not limited to, identifying users that would be impacted by enforcing a specific compliance control, devices that would be impacted as part of enforcing the compliance control and/or the extent of such impact (e.g., estimated downtime, changes to availability of services, applications or the like that run on the impacted devices, etc.), and/or any other appropriate measures relating to the impact of implementing and/or enforcing a compliance control.

Figure 11:
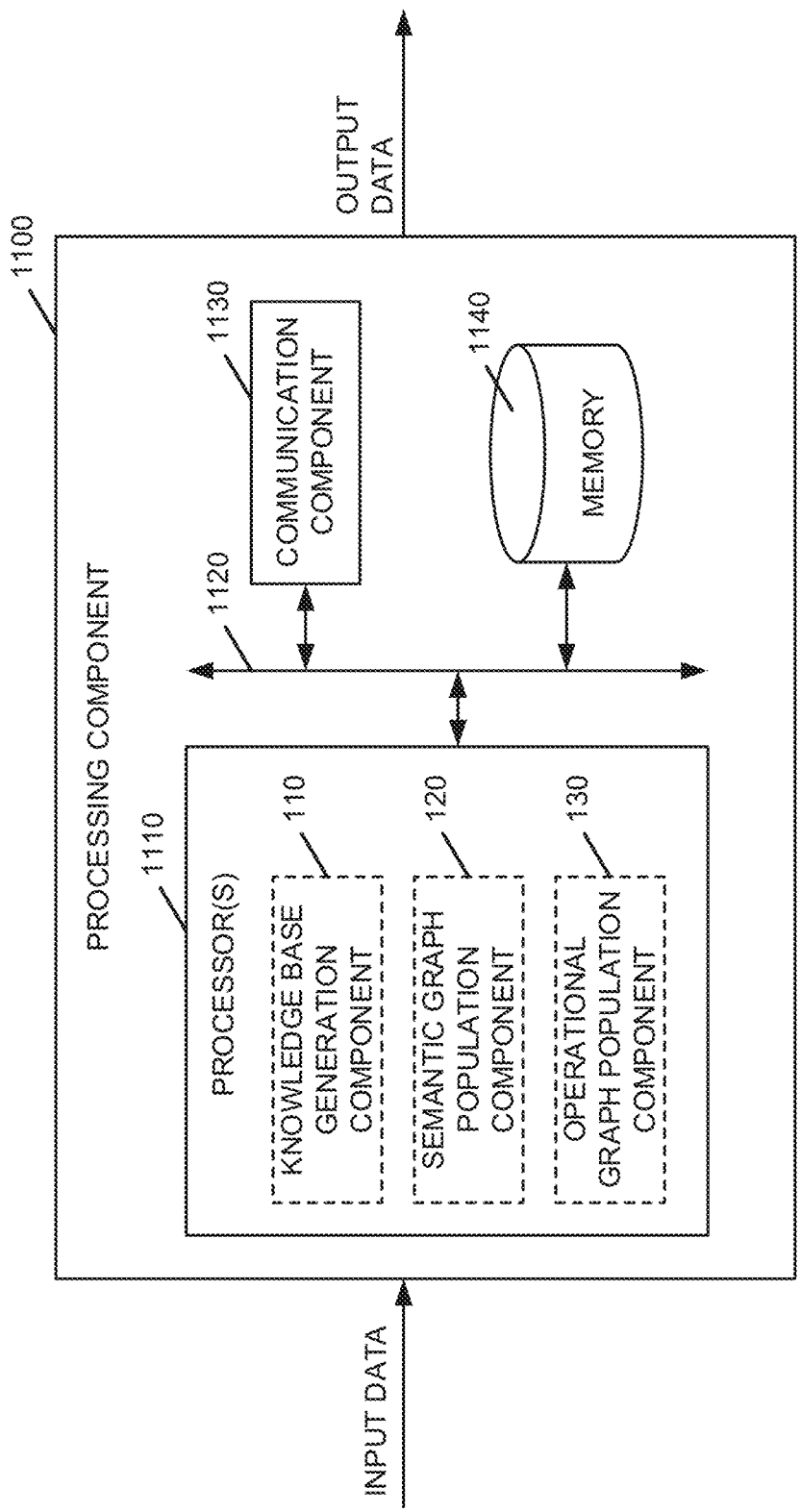
FIG. 11 is a block diagram of an example, non-limiting processing components according to one or more embodiments described herein.

Referring next to FIG. 11, a processing component 1100 that can be utilized to implement one or more aspects described herein is illustrated in accordance with one or more embodiments. Repetitive description of like elements employed in other embodiments described herein is omitted for sake of brevity.

As shown in FIG. 11, the processing component 1100 can be associated with at least one processor 1110 (e.g., a central processing unit, a graphical processing unit, etc.), which can be utilized to implement one or more of the knowledge base generation component 110, the semantic graph population component 120, and/or the operational graph population component 130 as described above. The processor(s) 1110 can be connected via a data bus 1420 to one or more additional sub-components of the processing component 1100, such as a communication component 1130 and/or a memory 1140. While the communication component 1130 is illustrated as implemented separately from the processor(s) 1110, the processor(s) 1110 in some embodiments can additionally be used to implement the communication component 1130. In still other embodiments, the communication component 1130 can be external to the processing component 1100 and communicate with the processing component 1100 via a separate communication link.

The memory 1140 can be utilized by the processing component 1100 to store data utilized by the processing component 1100 in accordance with one or more embodiments described herein. Additionally or alternatively, the memory 1140 can have stored thereon machine-readable instructions that, when executed by the processing component 1100, cause the processing component (and/or one or more processors 1110 thereof) to implement the knowledge base generation component 110, the semantic graph population component 120, and/or the operational graph population component 130 as described above.

In various embodiments, the processing component 1100 can be or include hardware, software (e.g., a set of threads, a set of processes, software in execution, etc.) or a combination of hardware and software that performs a computing task (e.g., a computing task associated with received data). For example, processing component 1100 can execute graph analysis and/or operations that cannot be performed by a human (e.g., are greater than the capability of a human mind). For example, the amount of data processed, the speed of processing of the data and/or the data types processed by processing component 1100 over a certain period of time can be respectively greater, faster and different than the amount, speed and data type that can be processed by a single human mind over the same period of time. For example, data processed by processing component 1100 can be raw data (e.g., raw textual data, raw numerical data, etc.) and/or compressed data (e.g., compressed textual data, compressed numerical data, etc.) associated with one or more computing devices. Moreover, processing component 1100 can be fully operational towards performing one or more other functions (e.g., fully powered on, fully executed, etc.) while also processing the above-referenced data.

Figure 12:
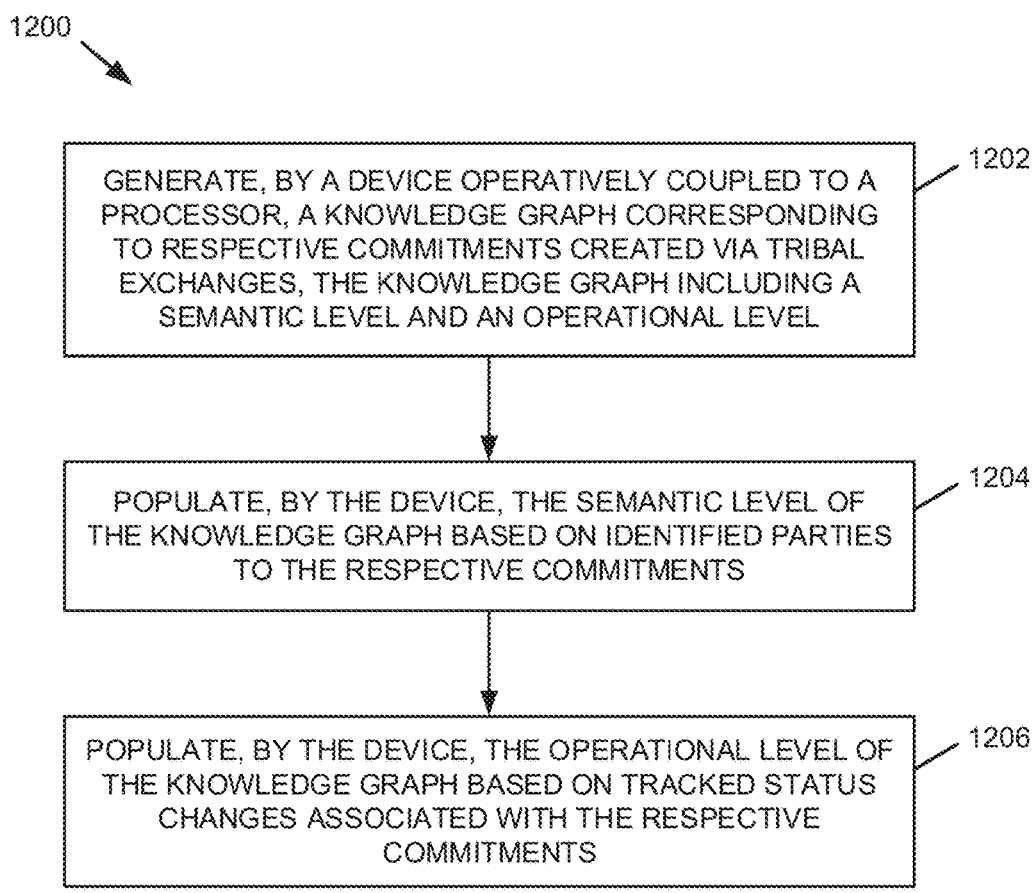
FIG. 12 is a flow diagram of an example, non-limiting computer-implemented method that facilitates maintaining tribal knowledge for accelerated compliance control deployment according to one or more embodiments described herein.

FIG. 12 illustrates a flow diagram of an example, non-limiting computer-implemented method 1200 that facilitates maintaining tribal knowledge for accelerated compliance control deployment according to one or more embodiments described herein. Repetitive description of like elements employed in other embodiments described herein is omitted for sake of brevity.

At 1202, a device operatively coupled to a processor, e.g., processor(s) 1110 of the processing component 1100, can generate (e.g., via a knowledge base generation component 110) a knowledge graph corresponding to respective commitments created via tribal exchanges. In an aspect, the knowledge graph generated at 1202 can include a semantic level and an operational level.

At 1204, the device can populate (e.g., via the semantic graph population component 120) the semantic level of the knowledge graph generated at 1202 based on identified parties to the respective commitments.

At 1206, the device can populate (e.g., via the operational graph population component 130) the operational level of the knowledge graph generated at 1202 based on tracked status changes associated with the respective commitments.

For simplicity of explanation, the computer-implemented methodologies described above are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies can alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because configuration of data packet(s) and/or communication between processing components is established from a combination of electrical and mechanical components and circuitry, a human is unable to replicate or perform the subject data packet configuration and/or the subject communication between processing components. For example, a human is unable to generate data for transmission over a wired network and/or a wireless network between processing components. Moreover, a human is unable to packetize data that can include a sequence of bits corresponding to information generated during a computing process, transmit data that can include a sequence of bits corresponding to information generated during a computing process, etc.

Figure 13:
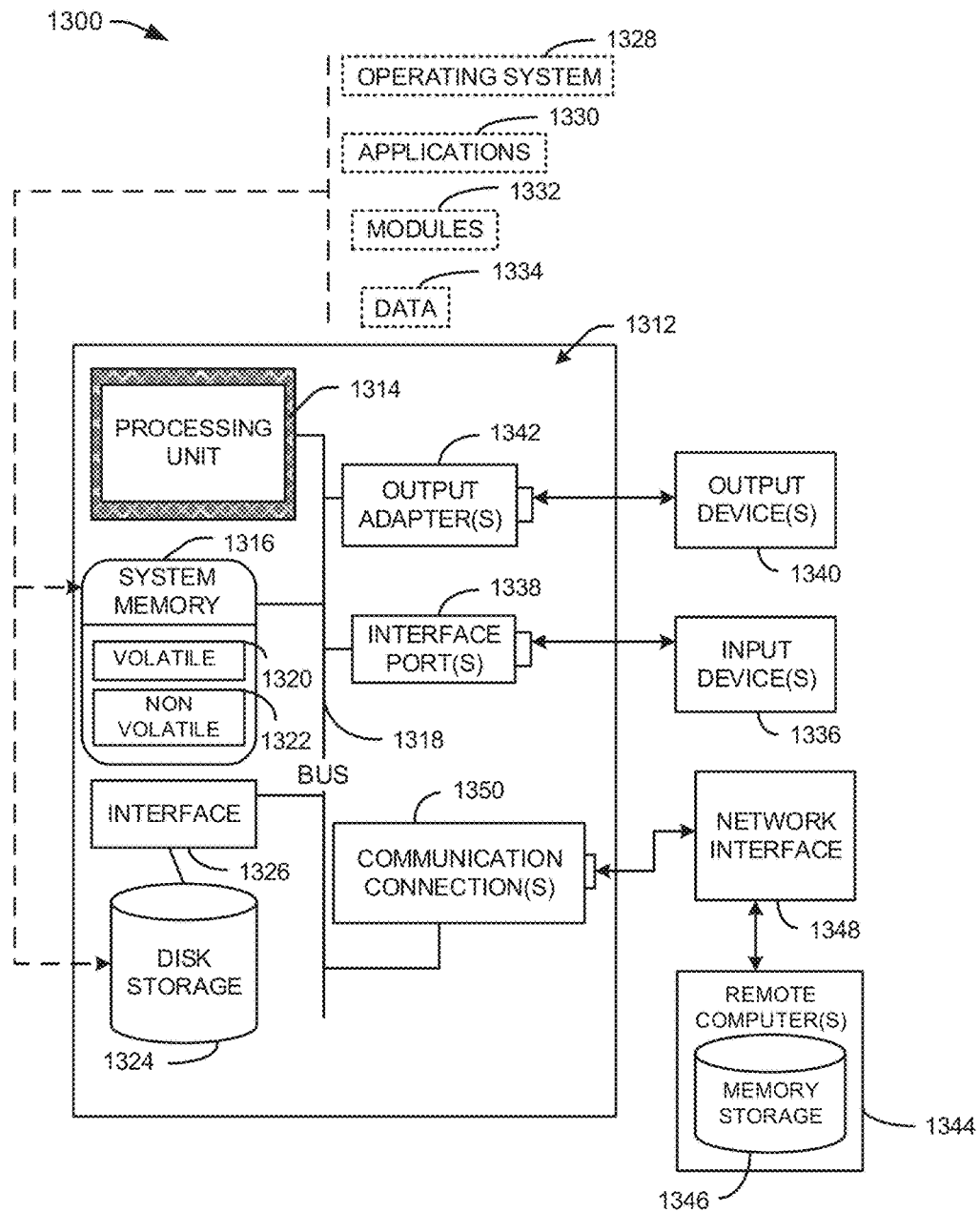
FIG. 13 is a block diagram of an example, non-limiting operating environment in which one or more embodiments described herein can be implemented.

In order to provide a context for the various aspects of the disclosed subject matter, FIG. 13 as well as the following discussion are intended to provide a general description of a suitable environment in which the various aspects of the disclosed subject matter can be implemented. FIG. 13 illustrates a block diagram of an example, non-limiting operating environment in which one or more embodiments described herein can be facilitated. Repetitive description of like elements employed in other embodiments described herein is omitted for sake of brevity. With reference to FIG. 13, a suitable operating environment 1300 for implementing various aspects of this disclosure can also include a computer 1312. The computer 1312 can also include a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314. The system bus 1318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1316 can also include volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1320 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1312 can also include removable/non-removable, volatile/nonvolatile computer storage media. FIG. 13 illustrates, for example, a disk storage 1324. Disk storage 1324 can also include, but is not limited to, devices like a magnetic disk drive, solid state drive, floppy disk drive, tape drive, Jaz drive, Zip drive, LS-100 drive, flash memory card, or memory stick. The disk storage 1324 also can include storage media separately or in combination with other storage media including, but not limited to, an optical disk drive such as a compact disk ROM device (CD-ROM), CD recordable drive (CD-R Drive), CD rewritable drive (CD-RW Drive), a digital versatile disk ROM drive (DVD-ROM), or a Blu-ray disc drive. To facilitate connection of the disk storage 1324 to the system bus 1318, a removable or non-removable interface is typically used, such as interface 1326. FIG. 13 also depicts software that acts as an intermediary between users and the basic computer resources described in the suitable operating environment 1300. Such software can also include, for example, an operating system 1328. Operating system 1328, which can be stored on disk storage 1324, acts to control and allocate resources of the computer 1312. System applications 1330 take advantage of the management of resources by operating system 1328 through program modules 1332 and program data 1334, e.g., stored either in system memory 1316 or on disk storage 1324. It is to be appreciated that this disclosure can be implemented with various operating systems or combinations of operating systems. A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port can be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a computer, a server, a router, a network PC, a workstation, a microprocessor based appliance, a peer device or other common network node and the like, and typically can also include many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1350 refers to the hardware/software employed to connect the network interface 1348 to the system bus 1318. While communication connection 1350 is shown for illustrative clarity inside computer 1312, it can also be external to computer 1312. The hardware/software for connection to the network interface 1348 can also include, for exemplary purposes only, internal and external technologies such as, modems including regular telephone grade modems, cable modems and DSL modems, ISDN adapters, and Ethernet cards.

Various embodiments of the present can be a system, a method, an apparatus and/or a computer program product at any possible technical detail level of integration. The computer program product can include a computer readable storage medium (or media) having computer readable program instructions thereon for causing a processor to carry out one or more aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of one or more embodiments of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform one or more aspects of the present invention.

One or more aspects of the present invention are described herein with reference to flowchart illustrations and/or block diagrams of methods, apparatus (systems), and computer program products according to one or more embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Various modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a memory that stores computer executable components; and
a processor that executes computer executable components stored in the memory, wherein the computer executable components comprise:
a knowledge base generation component that generates a knowledge graph corresponding to respective commitments created via tribal exchanges, the knowledge graph comprising a semantic level and an operational level;
a semantic graph population component that populates the semantic level of the knowledge graph based on identified parties to the respective commitments;
an operational graph population component that populates the operational level of the knowledge graph based on tracked status changes associated with the respective commitments; and
an assessment component that retrieves an account configuration from the knowledge graph at the semantic level or the operational level and assesses an impact of enforcing a compliance control associated with the knowledge graph.

2. The system of claim 1, wherein the tribal exchanges comprise at least one of conversations, forum postings, chats, emails, wikis, or software repository issues.

3. The system of claim 1, wherein the computer executable components further comprise:
a network parsing component that tracks respective conversations corresponding to the tribal exchanges, resulting in tracked conversations, and identifies respective establishment points in the tracked conversations for the respective commitments.

4. The system of claim 3, wherein the network parsing component extracts the tracked status changes associated with the respective commitments based on analysis of portions of the tracked conversations subsequent to the respective establishment points for the respective commitments.

5. The system of claim 1, wherein the knowledge base generation component builds a list of topics of interest based on the knowledge graph.

6. The system of claim 5, wherein the knowledge base generation component identifies subject matter experts related to respective ones of the topics of interest based on the knowledge graph and the tribal exchanges.

7. The system of claim 1, wherein the computer executable components further comprise:
a query processing component that receives a query associated with the knowledge graph, identifies parties associated with the tribal knowledge based on the semantic level of the knowledge graph, and extracts operational information associated with the tribal knowledge based on the operational level of the knowledge graph.

8. The system of claim 1, wherein the computer executable components further comprise:
a guidance component that provides information to a user regarding deployment of automated compliance controls based on the knowledge graph at the semantic level and the operational level.

9. A computer-implemented method comprising:
generating, by a device operatively coupled to a processor, a knowledge graph corresponding to respective commitments created via tribal exchanges, the knowledge graph comprising a semantic level and an operational level;
populating, by the device, the semantic level of the knowledge graph based on identified parties to the respective commitments;
populating, by the device, the operational level of the knowledge graph based on tracked status changes associated with the respective commitments; and
retrieving, by the device, an account configuration from the knowledge graph at the semantic level or the operational level and assessing an impact of enforcing a compliance control associated with the knowledge graph.

10. The computer-implemented method of claim 9, wherein the tribal exchanges comprise at least one of conversations, forum postings, chats, emails, wikis, or software repository issues.

11. The computer-implemented method of claim 9, further comprising:
constructing, by the device, a segmented information network from the tribal exchanges, resulting in a coherently structured information network constructed from the tribal exchanges originating from multiple distinct sources that lack a common information network structure; and
extracting, by the device, the respective commitments from the segmented information network.

12. The computer-implemented method of claim 9, wherein the extracting comprises:
tracking, by the device, respective conversations corresponding to the tribal exchanges, resulting in tracked conversations;
identifying, by the device, respective establishment points in the tracked conversations for the respective commitments; and
extracting, by the device, the tracked status changes associated with the respective commitments based on analysis of portions of the tracked conversations subsequent to the respective establishment points for the respective commitments.

13. The computer-implemented method of claim 9, further comprising:
building, by the device, a list of topics of interest based on the knowledge graph.

14. The computer-implemented method of claim 13, further comprising:
identifying, by the device, subject matter experts related to respective ones of the topics of interest based on the knowledge graph and the tribal exchanges using a set of objective rules for identifying the subject matter experts in an automated manner.

15. The computer-implemented method of claim 9, further comprising:
receiving, by the device, a query associated with the knowledge graph;
identifying, by the device, parties associated with the tribal knowledge based on the semantic level of the knowledge graph; and
extracting, by the device, operational information associated with the tribal knowledge based on the operational level of the knowledge graph.

16. A computer program product for extracting and maintaining tribal knowledge, the computer program product comprising a computer readable storage medium having program instructions embodied therewith, the program instructions executable by a processor to cause the processor to:

generate a knowledge graph corresponding to respective commitments created via tribal exchanges, the knowledge graph comprising a semantic level and an operational level;

populate the semantic level of the knowledge graph based on identified parties to the respective commitments;

populate the operational level of the knowledge graph based on tracked status changes associated with the respective commitments; and retrieve an account configuration from the knowledge graph at the semantic level or the operational level and assess an impact of enforcing a compliance control associated with the knowledge graph.

17. The computer program product of claim 16, wherein the program instructions further cause the processor to:

track respective conversations corresponding to the tribal exchanges, resulting in tracked conversations; and identify respective establishment points in the tracked conversations for the respective commitments.

18. The computer program product of claim 17, wherein the program instructions further cause the processor to:

extract the tracked status changes associated with the respective commitments based on analysis of portions of the tracked conversations subsequent to the respective establishment points for the respective commitments.

19. The computer program product of claim 16, wherein the program instructions further cause the processor to:

receive a query associated with the knowledge graph;

identify parties associated with the tribal knowledge based on the semantic level of the knowledge graph; and extract operational information associated with the tribal knowledge based on the operational level of the knowledge graph.

\* \* \* \* \*